US005715177A

United States Patent [19]

Machida et al.

[11] Patent Number: 5,715,177

[45] Date of Patent: Feb. 3, 1998

[54] TERMINAL SENSING DEVICE FOR A DISASTER PREVENTION MONITORING SYSTEM

[75] Inventors: Haruchika Machida; Yoshinori Kojima; Mashahiro Kii, all of Tokyo, Japan

[73] Assignee: Hochiki Corporation, Tokyo, Japan

[21] Appl. No.: 671,675

[22] Filed: Jun. 28, 1996

[30] Foreign Application Priority Data

Jun. 30, 1995 [JP] Japan .................................... 7-165128

[51] Int. Cl.[6] ........................................ G05B 15/02

[52] U.S. Cl. ........................................ 364/550; 340/511

[58] Field of Search .............................. 364/550, 505, 364/506, 138, 185, 557; 340/501, 506–513, 517–524, 588, 825.56

[56] References Cited

U.S. PATENT DOCUMENTS

| | | | |
|---|---|---|---|
| 4,543,565 | 9/1985 | Obersein et al. | 340/506 |
| 4,556,873 | 12/1985 | Yamada et al. | 340/630 |
| 4,568,924 | 2/1986 | Wüthrich et al. | 340/587 |
| 4,757,303 | 7/1988 | Scheidweiler | 340/501 |
| 4,839,645 | 6/1989 | Lill | 340/870.17 |
| 4,864,519 | 9/1989 | Appleby et al. | 364/550 |
| 4,884,222 | 11/1989 | Nagashima et al. | 364/550 |
| 5,086,293 | 2/1992 | Takahashi et al. | 340/506 |
| 5,448,224 | 9/1995 | Mochizuki | 340/589 |

FOREIGN PATENT DOCUMENTS

| | | | |
|---|---|---|---|
| 0148949 | 7/1985 | European Pat. Off. | G08B 17/06 |
| 0419668 | 4/1991 | European Pat. Off. | G08B 17/00 |
| 0526898 | 2/1993 | European Pat. Off. | G08B 26/00 |
| 0660282 | 6/1995 | European Pat. Off. | G08B 17/00 |

OTHER PUBLICATIONS

Patent Abstracts of Japan, vol. 13, No. 590 (P–984), Dec. 26, 1989, & JP-A-01 251197 (Nohmi Bosai), Oct. 6, 1989, *Abstract.

*Primary Examiner*—James P. Trammell
*Attorney, Agent, or Firm*—Sughrue, Mion, Zinn, Macpeak & Seas, PLLC

[57] ABSTRACT

A transmission processing unit is disposed in a terminal sensing device for a disaster prevention monitoring system. The transmission processing transmits a detection data to a central unit of the system, only when the detection data is equal to or higher than a predetermined level threshold and a difference between the detection data and a detection data of a preceding transmission is equal to or larger than a predetermined level difference threshold ΔTH. Alternatively, the transmission processing unit transmits the detection data to the central unit of the system, only when the detection data is equal to or higher than the predetermined level threshold and a time period which is elapsed after the transmission of the preceding detection data is equal to or longer than a predetermined time period threshold.

6 Claims, 11 Drawing Sheets

TERMINAL SENSING DEVICE FOR A DISASTER PREVENTION MONITORING SYSTEM

BACKGROUND OF THE INVENTION

1. Field of the Invention

The invention relates to a terminal sensing device for a disaster prevention monitoring system which periodically transmits detection data such as a temperature and a smoke density obtained from an analog detection signal from a sensor to a central monitoring device so that an abnormal status such as a fire is detected, and particularly relates to a terminal sensing device for a disaster prevention monitoring system which, only when an amount relating to such a detection data exceeds a predetermined threshold, transmits the detection data.

2. Description of the Related Art

Conventionally, a disaster prevention monitoring system which monitors a fire and the like has a configuration in which, as shown in FIG. 13, a plurality of terminal sensing devices 3 are connected to each of plural transmission paths 2 elongating from a receiver 1. Each terminal sensing device 3 has an analog sensor which detects smoke, temperature, etc. In response to a simultaneous AD-conversion command which is issued from the receiver 1 to the terminal sensing devices 3 so as to acquire data, for example, a detection signal from the analog sensor is AD-converted into a detection data and the detection data is stored in an internal memory. The acquisition of detection data in response to the simultaneous AD-conversion command is conducted at time intervals of, for example, one minute.

During each time interval of the simultaneous AD-conversion command, the receiver conducts polling in which terminal addresses determined for each transmission path are sequentially designated, so that the detection data stored in the memories of the terminal sensing devices 3 are transmitted to the receiver 1. On the basis of the received detection data, the receiver judges whether a fire occurs or not.

The response or transmission of a detection data from each terminal sensing device 3 is conducted in the following manner. As shown in FIG. 14, for example, a predetermined threshold TH is determined. When the current detection data is lower than the threshold TH, the detection data is not transmitted and the terminal sensing device 3 transmits status information indicative of a normal status. When the detection data is equal to or higher than the threshold TH, the detection data is transmitted.

When there occurs no fire, therefore, most of the responses are status data indicative of a normal status and responses of a detection data exceeding the threshold TH can be reduced to a very small number. As compared with a configuration in which all responses are transmitted even when they are detection data clearly indicating that there occurs no fire, the load of the receiver is relieved so as to leave a margin for a processing to be conducted in the case of a fire.

Also, in a conventional device having a configuration in which only a detection data exceeding a threshold is transmitted, however, there arises a following problem. When a fire once occurs, detection data of a terminal sensing device located in a place where the fire occurs and terminal sensing devices located in the vicinity of the place exceed the threshold. This causes detection data indicative of abnormality to be transmitted in succession to the receiver, thereby increasing the transmission load and the load of the receiver. Particularly when the transmission of a detection data is repeated for a long term, a situation may finally arise where the receiver cannot deal with a resulting large amount of data.

SUMMARY OF THE INVENTION

It is an object of the invention to provide a terminal sensing device for a disaster prevention monitoring system in which, even when detection data exceed a threshold, the amount of detection data to be transmitted to a receiver is restricted so that the load of the receiver is maintained within an appropriate range, thereby enhancing the reliability of the system.

A terminal sensing device for a disaster prevention monitoring system according to the present invention which is connected to a transmission path elongating from a central monitoring device, the terminal sensing device comprising: a detecting unit which detects an analog detection signal; and transmission processing unit for judging at a predetermined period as to whether or not detection data obtained from the analog detection signal is equal to or higher than a predetermined level threshold and a difference between the detection data and a detection data of a preceding transmission is equal to or larger than a predetermined level difference threshold, and for transmitting the detection data to the central monitoring device, when the detection data is equal to or higher than the predetermined level threshold and the difference between the detection data and the detection data of the preceding transmission is equal to or larger than a predetermined level difference threshold. Alternatively, the transmission processing unit judges at a predetermined period as to whether or not detection data obtained from the analog detection signal is equal to or higher than a predetermined level threshold and a elapsed time period which is elapsed after a preceding detection data transmission is equal to or longer than a predetermined time period threshold, and transmits the detection data to the central monitoring device, when the detection data is equal to or higher than the predetermined level threshold and the elapsed time period is equal to or longer than the predetermined time period threshold.

According to the present invention, even if the detection data is equal to or higher than the level threshold, when the difference between the detection data $X_n$ and the detection data of a preceding transmission is smaller than the level difference threshold, no significant change occurs and hence the detection data is not transmitted. In other words, only when the level change of a detection data is large, the detection data is transmitted. Even if a detection data exceeds the level threshold, when the change is small, the detection data is not transmitted. As a result, the information amount of detection data to be transmitted to the receiver can be reduced so that detection data of a large change are efficiently processed by the receiver. Alternatively, even if the detection data exceeds the level threshold, when the time period which is elapsed after a time of the preceding detection data transmission is shorter than the time period threshold, the detection data is not transmitted. A detection data is transmitted after the elapsed time period becomes equal to or longer than the time period threshold. Therefore, the information amount of detection data to be transmitted to the receiver can be reduced so that detection data are efficiently processed by the receiver.

PREFERRED EMBODIMENTS OF THE INVENTION

Preferred embodiments of the present invention will be described with reference to the accompanying drawings as follows.

Figure 1:
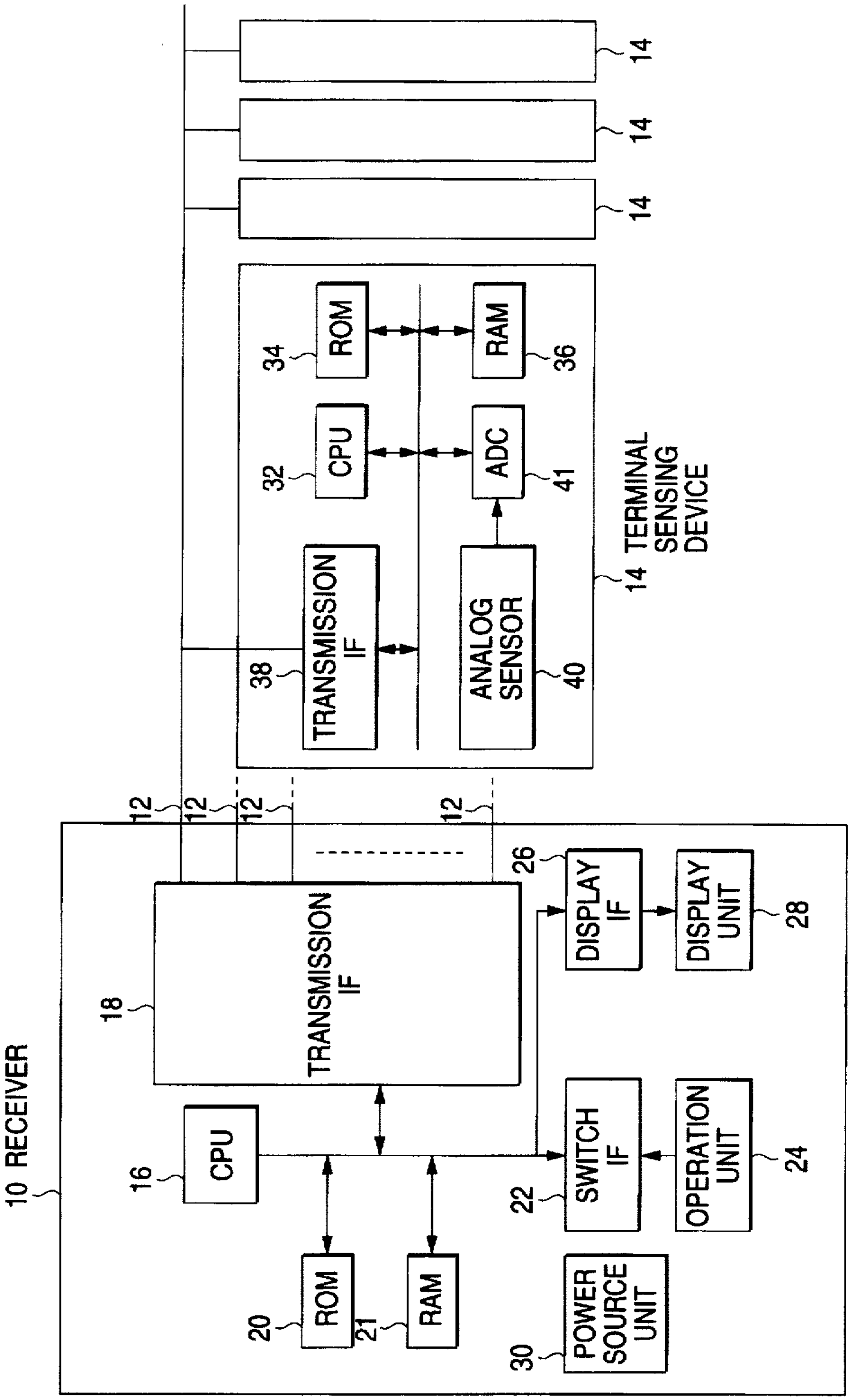
FIG. 1 is a diagram of a disaster prevention monitoring system to which the present invention is applied.

FIG. 1 is a block diagram of a disaster prevention monitoring system in which the terminal sensing device of the present invention is used. Referring to FIG. 1, from a receiver 10 which serves as the central monitoring device, a plurality of transmission paths 12 elongate for each story toward a monitoring zone. A plurality of terminal sensing devices 14 are connected to each of the transmission paths 12. In each of the transmission paths 12, terminal addresses are previously assigned to the terminal sensing devices 14.

The receiver 10 has a CPU 16 which serves as a control unit. A transmission IF 18 is connected to a bus of the CPU 16. The plurality of transmission paths 12 are elongated from the transmission IF 18. A RAM 21 which stores various table information and data required for monitoring a fire is connected to the bus of the CPU 16. Furthermore, an operation unit 24 having various operation switches is connected to the bus through a switch IF 22, and a display unit 28 having a display device such as a liquid crystal display device or a CRT is connected to the bus through a display IF 26. The receiver further includes a power source unit 30.

The terminal sensing devices 14 of the present invention has a CPU 32 which functions as a terminal control unit. A ROM 34, a RAM 36, and a transmission IF 38 are connected to the CPU 32 through a bus. The terminal sensing device 14 further includes an analog sensor 40. An analog detection signal from the analog sensor 40 is converted into a digital data by an AD converter 41 so as to be captured as a detection data.

As the analog sensor 40, useful is an appropriate analog sensor such as a smoke sensor of the scattered light type for detecting smoke due to a fire, or a temperature sensor for detecting a temperature rise due to a fire.

Next, the basic monitoring operation of the disaster prevention monitoring system of FIG. 1 will be described. The transmission IF 18 of the receiver 10 issues to the transmission paths 12 a simultaneous AD-conversion command for acquiring detection data of the analog sensors and holding the data, at fixed time intervals, for example, intervals of one minute. The simultaneous AD-conversion command is issued in the form of a so-called common-address command in which no specific terminal address is designated.

The terminal sensing device 14 which has received the simultaneous AD-conversion command from the receiver 10 captures the received command through the transmission IF 38 and informs the CPU 32 thereof. When the received command is recognized as the simultaneous AD-conversion command, the CPU 32 activates the AD converter 41 so that the analog detection signal currently output from the analog sensor 40 is converted into a digital data. The digital data is held by the RAM 36 as a detection data.

During a period from the completion of the transmission of the simultaneous AD-conversion command to the next transmission of the command, the transmission IF 18 of the receiver 10 transmits to the transmission path 12 a polling command with sequentially designating addresses the number of which is equal to the maximum number of settable addresses (for example, 127 addresses). When, in response to the transmission of the polling command, the transmission IF 38 of the terminal sensing devices 14 judges that the received address coincides with the allocated address of the device, the transmission IF captures the polling command and informs the CPU 32.

When the polling command is judged, the CPU 32 adds the terminal address of the device to the detection data which is currently held by the RAM 36, and transmits the combination of the address and the detection data to the receiver 10 through the transmission IF 38. In the terminal sensing device 14 of the invention, when a detection data held by the RAM 36 is to be transmitted to the receiver 10 as described above, preset transmission conditions for the detection data are judged by transmission processing function of the CPU 32, and, only when the transmission conditions are satisfied, the detection data is transmitted to the receiver 10.

Figure 2:
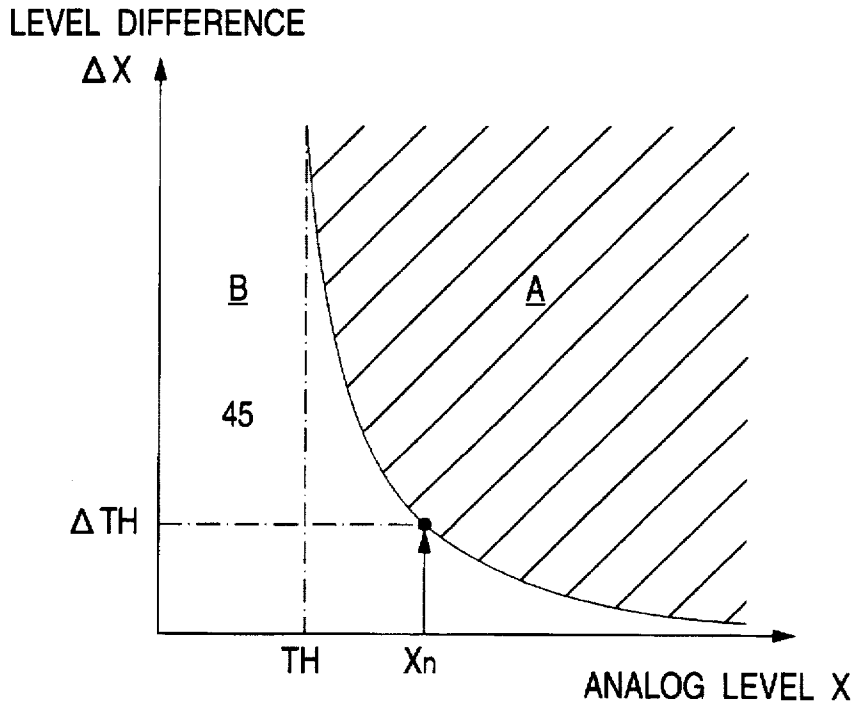
FIG. 2 is a characteristic diagram for determining transmission conditions of a first embodiment on the basis of an analog level and a level difference.

FIG. 2 is a characteristic diagram for determining the transmission conditions for a detection data in the first embodiment of the terminal sensing device 14 of the invention which is used in the disaster prevention monitoring system of FIG. 1.

In the characteristic diagram of FIG. 2, when the following two conditions are satisfied, a detection data is transmitted to the receiver 10.

(1) The detection data $X_n$ is equal to or higher than a predetermined level threshold TH (condition 1).

(2) The level difference $\Delta X$ between the current detection data $X_n$ and the detection data $X_{n-1}$ of the preceding transmission is equal to or larger than a predetermined level difference threshold $\Delta TH$ which is determined on the basis of the current detection data $X_n$ (condition 2).

FIG. 2 will be described in more detail. In FIG. 2, the abscissa is the analog level X, and the ordinate is the level difference $\Delta X$ between current and previous analog detection signals which are detected at fixed time intervals. Since the analog detection changes increasingly or decreasingly, the level difference $\Delta X$ is the absolute value.

In the two-dimensional coordinate of the analog level X and the level difference $\Delta X$, set is the level threshold TH which is determined by the first condition. The level threshold TH is the same as that used in the conventional device. When the analog level X is equal to or higher than the level threshold TH, the detection data is transmitted to the receiver 10.

Figure 3:
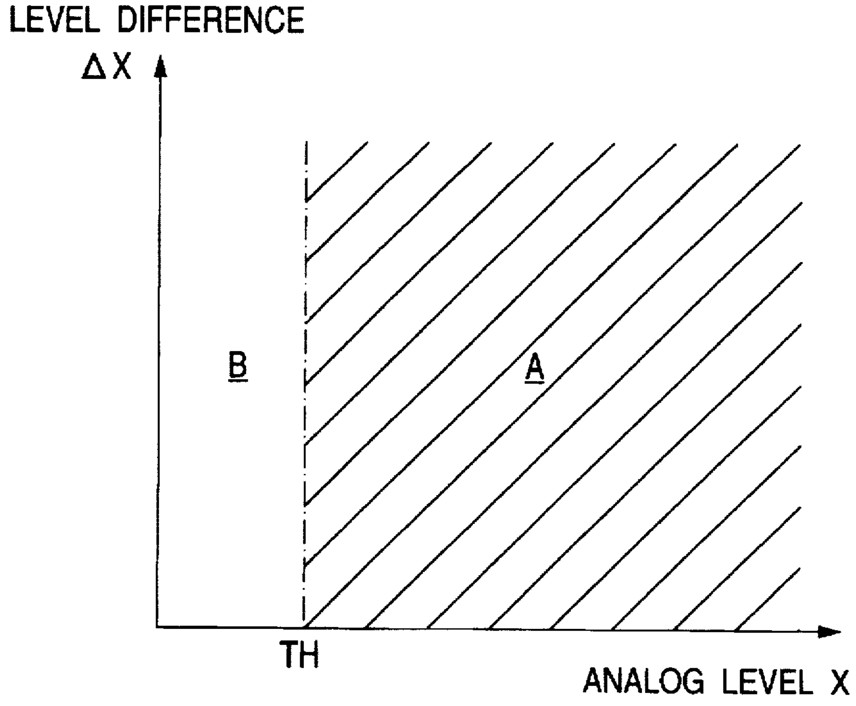
FIG. 3 is a characteristic diagram in the case where only a level threshold is used as transmission conditions.

FIG. 3 is a characteristic diagram in the case where a detection data which satisfies condition 1 or in which the analog level is equal to or higher than the level threshold TH is to be transmitted. This characteristic diagram is the same as that of the conventional device. In a hatched region A which is separated from another region by the level threshold TH and in which the analog level X is equal to or higher than the threshold, any detection data is transmitted to the receiver 10 irrespective of the level difference ΔX. In a region B in which the analog level X is lower than the level threshold TH, a detection data is not transmitted to the receiver regardless of the level difference ΔX. In other words, the information amount of detection data to be transmitted to the receiver 10 can be reduced by the amount corresponding to the region B.

In the characteristic diagram of the first embodiment of FIG. 2, furthermore, a region which is defined by a characteristic curve 45 is set in the space of the analog level X and the level difference ΔX. When the function of the characteristic curve 45 is indicated by F(X), the curve can be expressed as follows:

$$\Delta X = F(X) + TH$$

For example, a suitable function such as $e^{-n}$ or a function of degree n can be used as the function F(X) as required. In the above, n is an integer or n=1, 2, 3, . . . .

The characteristic curve 45 sets condition 2 of the first embodiment described in (2) above. According to condition 2, the value of the level difference ΔX which is determined by the current analog level $X_n$ and the characteristic curve 45 is obtained as a level difference threshold ΔTH. When the level difference $\Delta X_n$ between the current detection data $X_n$ and a detection data $X_{n-1}$ of a preceding transmission is equal to or larger than the level difference threshold ΔTH calculated from the characteristic curve 45, or when the level difference is in the hatched area A on the right side of the characteristic curve 45, the current detection data is transmitted to the receiver 10. By contrast, when the level difference is in the area B on the left side, the current detection data is not transmitted to the receiver 10.

When the transmission conditions of the first embodiment of FIG. 2 are compared with those of the conventional one of FIG. 3 in which only the level threshold TH is used, the information amount of detection data to be transmitted to the receiver 10 can be reduced by the amount corresponding to the region which is below the characteristic curve 45 in the transmission region A of FIG. 3 and which functions as the nontransmission region B.

In the characteristic curve 45 of FIG. 2, furthermore, the level difference threshold ΔTH which is used in judgment of the level difference ΔX is set so as to become smaller as the analog level X is increased. This means that, even when the level difference is small, a detection data is transmitted to the receiver 10 at a higher frequency as the analog level X becomes higher.

Figure 4:
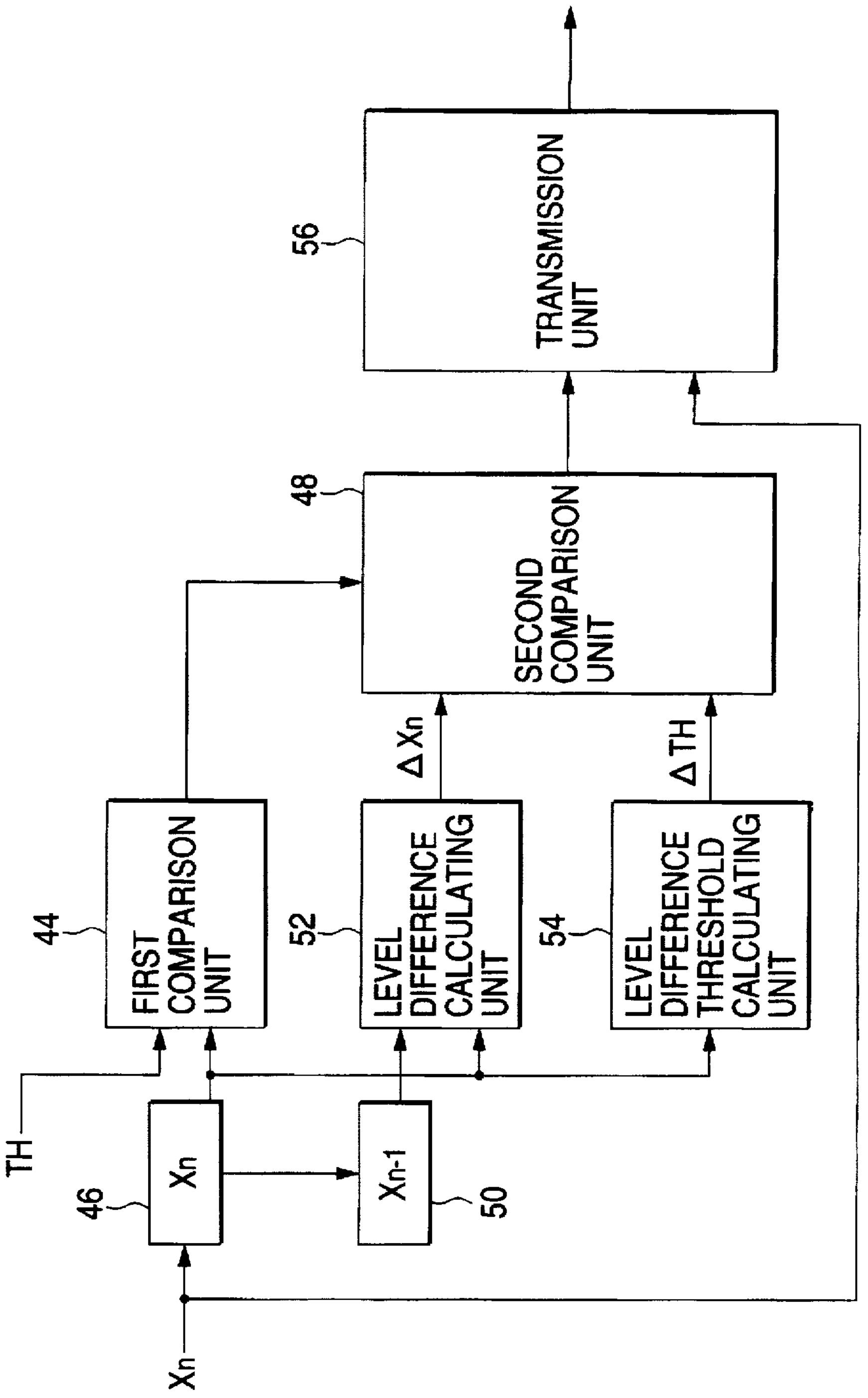
FIG. 4 is a functional block diagram of the first embodiment.

FIG. 4 is a functional block diagram of the terminal sensing device 14 which conducts transmission of detection data according to the transmission conditions of the first embodiment shown in FIG. 2. This function is realized by the program control of the CPU 32 disposed in the terminal sensing device 14 of FIG. 1.

Referring to FIG. 4, a latch 46 latches the detection data $X_n$ currently held by the memory, at fixed transmission intervals which are based on the polling command from the receiver 10. A first comparison unit 44 compares the detection data $X_n$ latched by the latch 46 with the predetermined level threshold TH which is previously set. When the detection data $X_n$ is equal to or higher than the level threshold TH, the first comparison unit 44 sends a comparison output 1 to a second comparison unit 48.

The second comparison unit 48 is activated in response to the comparison output 1 of the first comparison unit 44 so as to conduct a second comparison. A level difference $\Delta X_n$ is supplied from a level difference calculation unit 52 to one input of the second comparison unit 48. The level difference calculation unit 52 calculates the absolute value of the difference between the detection data $X_n$ which is currently held by the latch 46 and disposed to be transmitted, and the detection data $X_{n-1}$ of the preceding transmission which is held by a latch 50.

The level difference threshold ΔTH calculated by a level difference threshold calculation unit 54 is supplied to the other input of the second comparison unit 48. In the level difference threshold calculation unit 54, for example, the function F(X) of the characteristic curve 45 shown in FIG. 2 is preset and the level difference threshold ΔTH is calculated by using the detection data $X_n$ supplied from the latch 46.

It is a matter of course that the level difference threshold calculation unit 54 may be configured so that table information of showing the level difference threshold ΔTH with respect to various detection data X is previously prepared and the level difference threshold ΔTH corresponding to the detection data $X_n$ is read out with using the detection data $X_n$ as a table address.

The second comparison unit 48 is activated in the state where the comparison output 1 of the first comparison unit 44 is received, and compares the level difference threshold ΔTH which is currently input with the level difference $\Delta X_n$. When the level difference is equal to or larger than the level difference threshold ΔTH, the second comparison unit 48 outputs a comparison output 1 to a transmission unit 56. Upon reception of the comparison output 1 of the second comparison unit 48, the transmission unit 56 conducts the operation of transmitting the currently input detection data $X_n$ to the receiver 10. When the output of the second comparison unit 48 is 0, the transmission unit 56 does not conduct the operation of transmitting the detection data $X_n$ and the detection data $X_n$ is discarded.

Even if the detection data is lower than the level threshold TH, when a predetermined time period has elapsed, the detection data is sent out as a zero data at time intervals, for example, once per hour.

Figure 5:
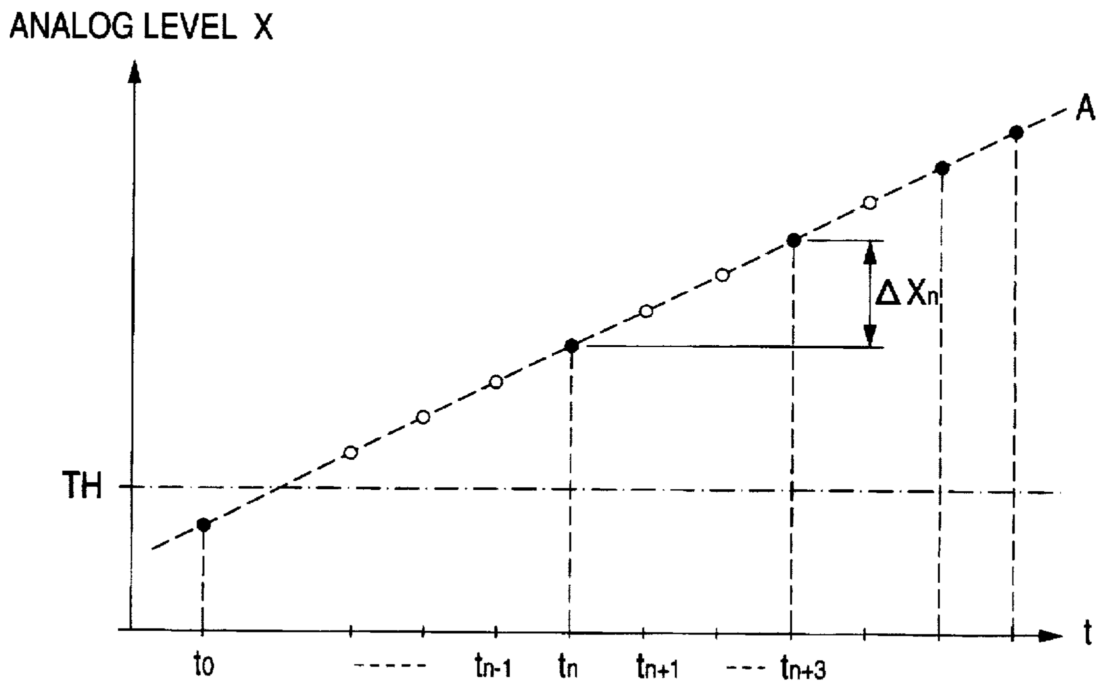
FIG. 5 is a time chart of the transmission operation which is conducted in the first embodiment in the case where the level of a detection data is linearly raised.

FIG. 5 is a time chart of the transmission operation which is conducted in the first embodiment of the present invention in the case where the analog level X is increased at a constant rate with the passage of time. At time $t_0$, a zero data is transmitted. After time $t_0$, the current detection data is compared with the level threshold TH at fixed transmission intervals. When the detection data is lower than the level threshold TH, the detection data is not transmitted.

By contrast, when the current detection data exceeds the level threshold TH, the level difference ΔX between the detection data and that of the preceding transmission or at time $t_0$ is calculated. The level difference is compared with the level difference threshold ΔTH which is calculated from the current detection data in accordance with the characteristic curve 45 of FIG. 2. When the level difference is smaller than the level difference threshold ΔTH, the transmission of the detection data is not conducted.

In a line A, at time $t_n$, the level difference $\Delta X_n$ exceeds the level difference threshold ΔTH which is currently calculated, and hence the transmission of the detection data is conducted as indicated by the solid circle. Thereafter, detection data for, e.g., two transmissions are decimated and the detection data transmission is conducted at time $t_{n+3}$. The decimation intervals are set so as to be shorter as the analog level X becomes higher.

Figure 6:
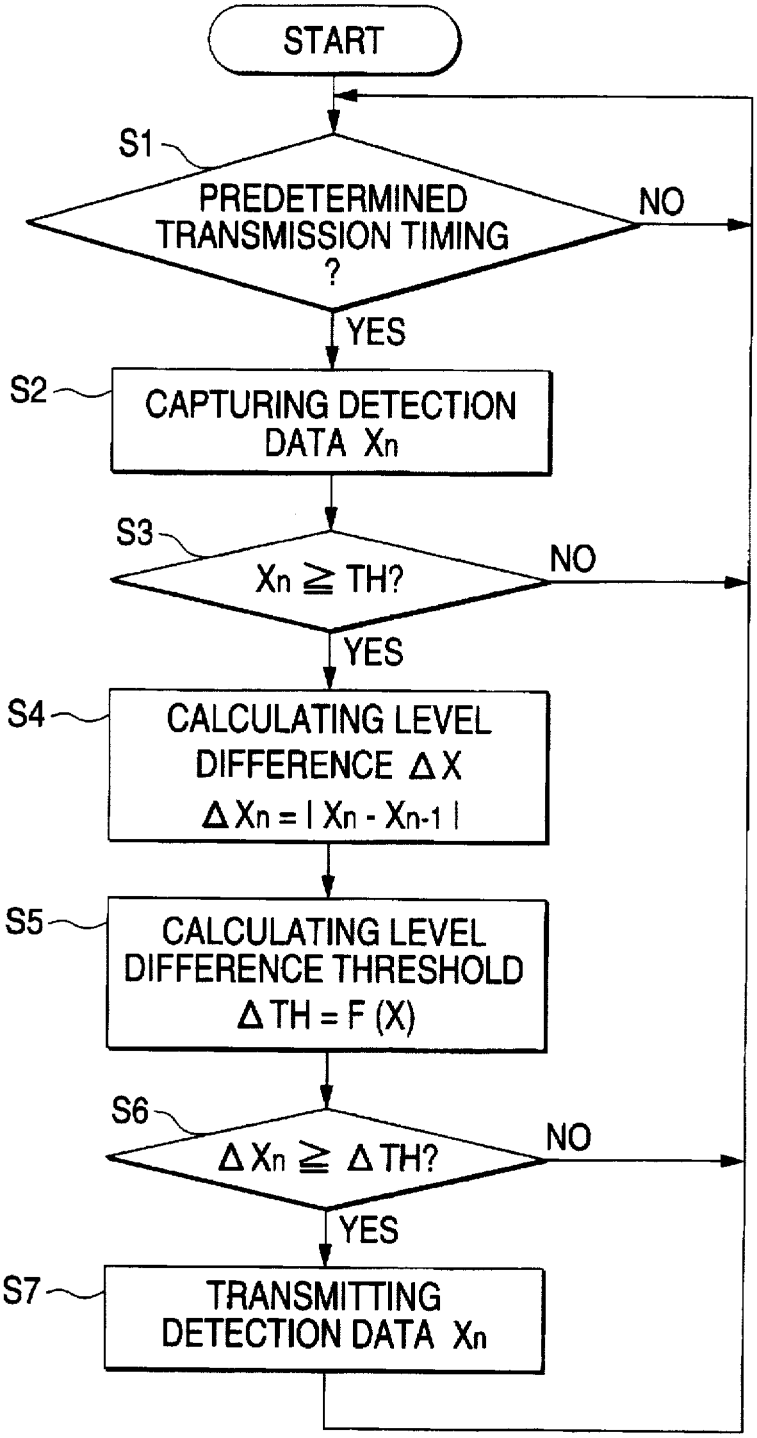
FIG. 6 is a flowchart of the transmission in the first embodiment.

FIG. 6 is a flowchart of the transmission of a detection data in the first embodiment shown in the functional block diagram of FIG. 4. At step S1, it is checked whether the process reaches the predetermined transmission timing or not. If the process reaches the transmission timing, the detection data $X_n$ currently held by the memory is captured at step S2 and then checked to see whether it is equal to or higher than the predetermined level threshold TH or not. If the detection data is equal to or higher than the predetermined level threshold TH, the process proceeds to step S4 wherein the level difference ΔX is calculated.

Next, the level difference threshold ΔTH is calculated on the basis of the current detection data $X_n$ in accordance with the predetermined function F(X). At step S6, the level difference ΔX is checked to see whether it is equal to or larger than the level difference threshold ΔTH or not. If the level difference ΔX is equal to or larger than the level difference threshold ΔTH, the current detection data $X_n$ is transmitted at step S7 to the receiver 10.

Figure 7:
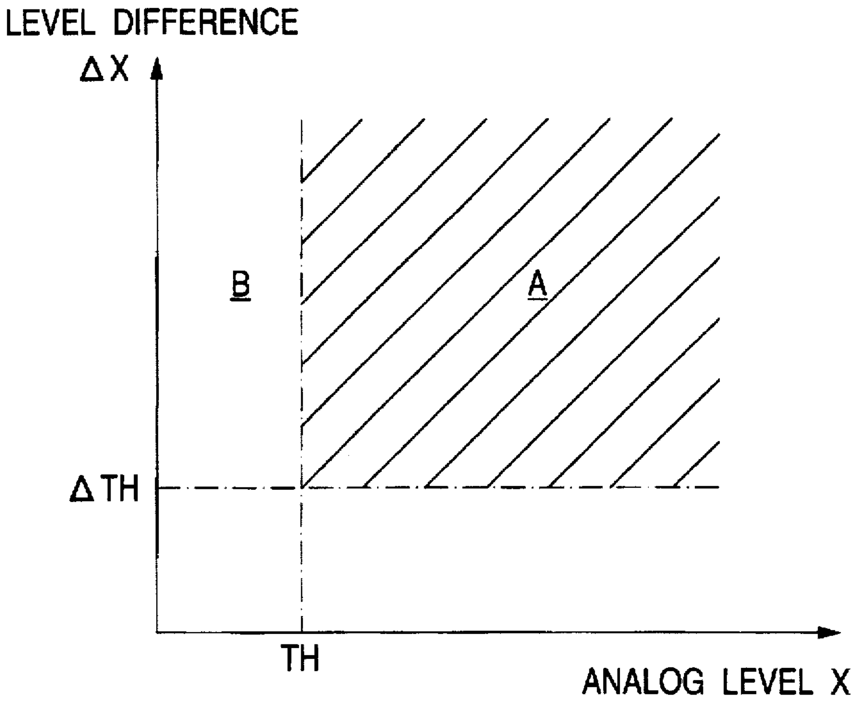
FIG. 7 is a characteristic diagram for determining transmission conditions of the first embodiment in the case where a level difference threshold is constant.

FIG. 7 is another characteristic diagram of the transmission conditions in the first embodiment of the present invention. In the characteristic diagram, the level difference threshold ΔTH for the level difference ΔX in condition 2 is fixed to a predetermined certain value. In the case where the level difference threshold ΔTH is fixed to a certain value in this way, a detection data is transmitted to the receiver only when the level of the detection data is in the hatched region A where the level is equal to or higher than the level threshold TH and the level difference ΔX between the current detection data and a detection data of a preceding transmission is equal to or larger than the constant level difference threshold ΔTH.

Figure 8:
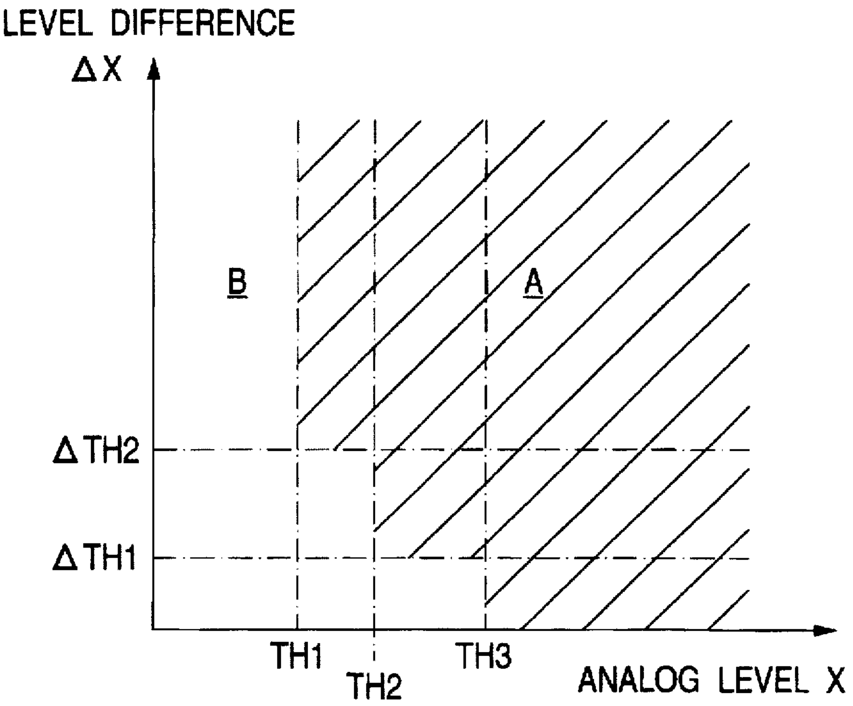
FIG. 8 is a characteristic diagram for determining transmission conditions of the first embodiment in the case where a multi-level difference threshold is used.

FIG. 8 is a further characteristic diagram of the transmission conditions in the first embodiment of the present invention. In FIG. 8, the characteristic curve 45 of FIG. 2 is approximated by a polygonal line. Specifically, the analog level is set to have three level thresholds TH1, TH2, and TH3, and the level difference ΔX to have two level difference thresholds ΔTH1 and ΔTH2, thereby setting boundary characteristics of a step-like shape to separate the transmission region A from the nontransmission region B.

In this case, the comparison and judgment process is conducted in the following manner. First, the level of the detection data $X_n$ is checked to judge the region (one of the four regions divided by the level thresholds TH1 to TH3) to which the level belongs. If the level is in the region between the level thresholds TH1 and TH2, the level difference ΔX is subjected to the comparison and judgment by using the level difference threshold ΔTH2. If the level is in the region between the level thresholds TH2 and TH3, the level difference ΔX is subjected to the comparison and judgment by using the level difference threshold ΔTH1. If the level is lower than the level threshold TH1, the transmission of the detection data is not conducted irrespective of the level difference ΔX. By contrast, if the level is equal to or higher than the level threshold TH3, any detection data is transmitted irrespective of the level difference ΔX.

The transmission conditions of the thus configured first embodiment are not restricted to those of FIGS. 2, 7, and 8 and an appropriate region may be determined as required.

Figure 9:
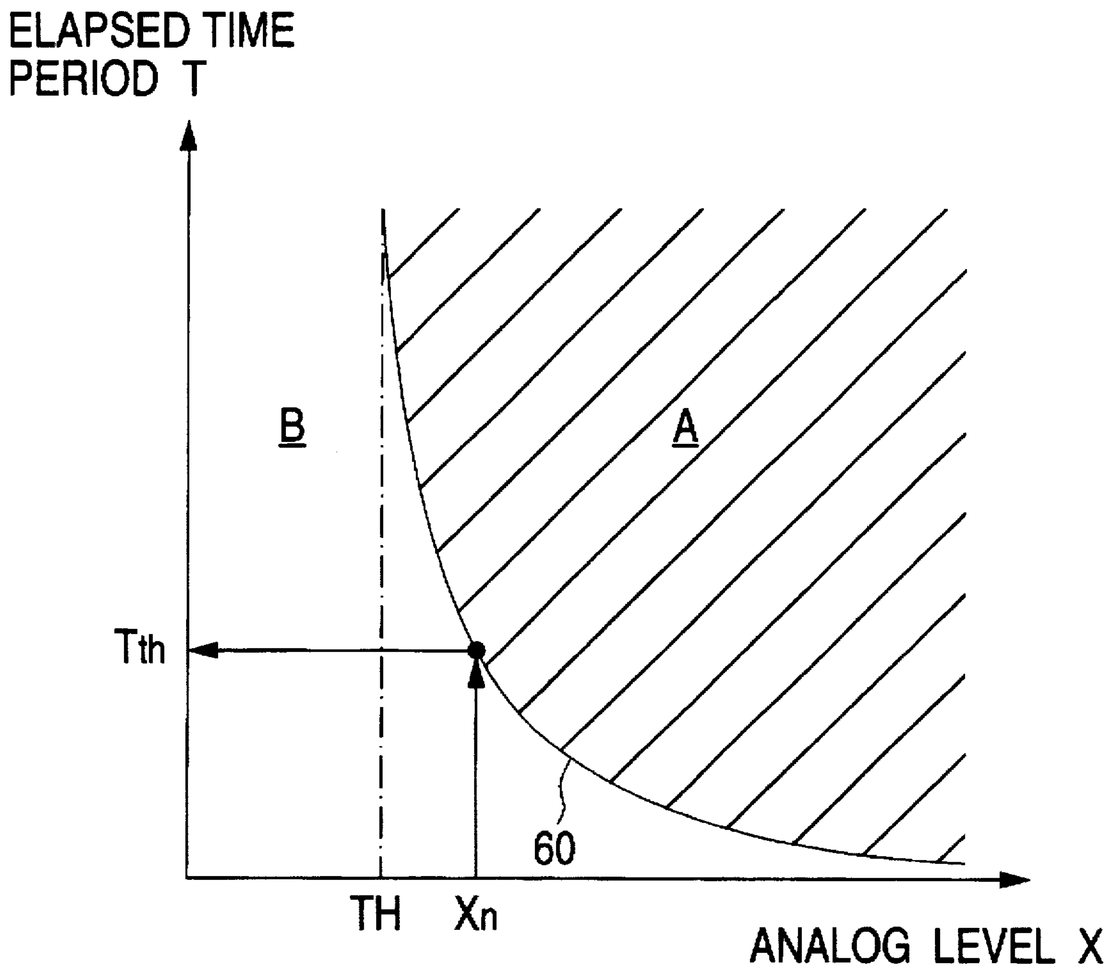
FIG. 9 is a characteristic diagram for determining transmission conditions of a second embodiment on the basis of an analog level and an elapsed time period.

Next, transmission conditions in the terminal sensing device of a second embodiment of the present invention will be described with reference to FIG. 9. In FIG. 9, the abscissa is the analog level X, and the ordinate is the time period T which has elapsed after a preceding transmission of a detection data. In the two-dimensional coordinate of the analog level X and the elapsed time period T, a characteristic curve 60 is set in the right region where the analog level X is equal to or higher than the level threshold TH, the hatched region A on the right side of the characteristic curve 60 is set as a transmission region, and the region B on the left side as a nontransmission region. When using an appropriate function G(X), the characteristic curve 60 can be expressed as follows:

$$T=G(X)+TH$$

For example, a function such as $e^{-n}$ or a function of degree n can be used as the function G(X) in the same manner as the characteristic curve 45 of FIG. 2.

The meanings of the transmission region A and the non transmission region B which are separated from each other by the characteristic curve 60 of FIG. 9 are as follows. When the level of the detection data $X_n$ is not higher than the level threshold TH, the transmission of the detection data $X_n$ is not conducted irrespective of the time period T which has elapsed after a preceding transmission. When the level of the detection data $X_n$ is equal to or higher than the level threshold TH, a time period threshold $T_{th}$ of the elapsed time period T is calculated on the basis of the detection data $X_n$ in accordance with the characteristic curve 60.

The calculated time period threshold $T_{th}$ is compared with the actual elapsed time period $T_n$. When the actual elapsed time period is equal to or longer than the time period threshold $T_{th}$ or in the transmission region A which is on the right side of the characteristic curve 60, the current detection data is transmitted. For the time period threshold $T_{th}$ which is calculated in accordance with the characteristic curve 60, a shorter time period is calculated as the analog level X becomes higher.

As a result, when the analog level X is low, the time period T which elapses until the succeeding transmission of a detection data is conducted is longer so that the time intervals become longer, whereby the information amount of detection data to be transmitted to the receiver can be reduced. When the analog level is raised, the time period threshold $T_{th}$ is reduced, and hence the elapsed time period for the transmission of a detection data becomes shorter so that detection data are transmitted to the receiver at short time intervals. In other words, as the analog level becomes higher, the information amount of detection data to be transmitted to the receiver is increased. The transmission conditions of the second embodiment of the present invention of FIG. 9 can be summarized as follows:

(1) The detection data is equal to or higher than the predetermined level threshold TH (condition 1).

(2) The time period T which has elapsed after the time of the preceding detection data transmission is equal to or longer than the predetermined time period threshold $T_{th}$ (condition 2).

Figure 10:
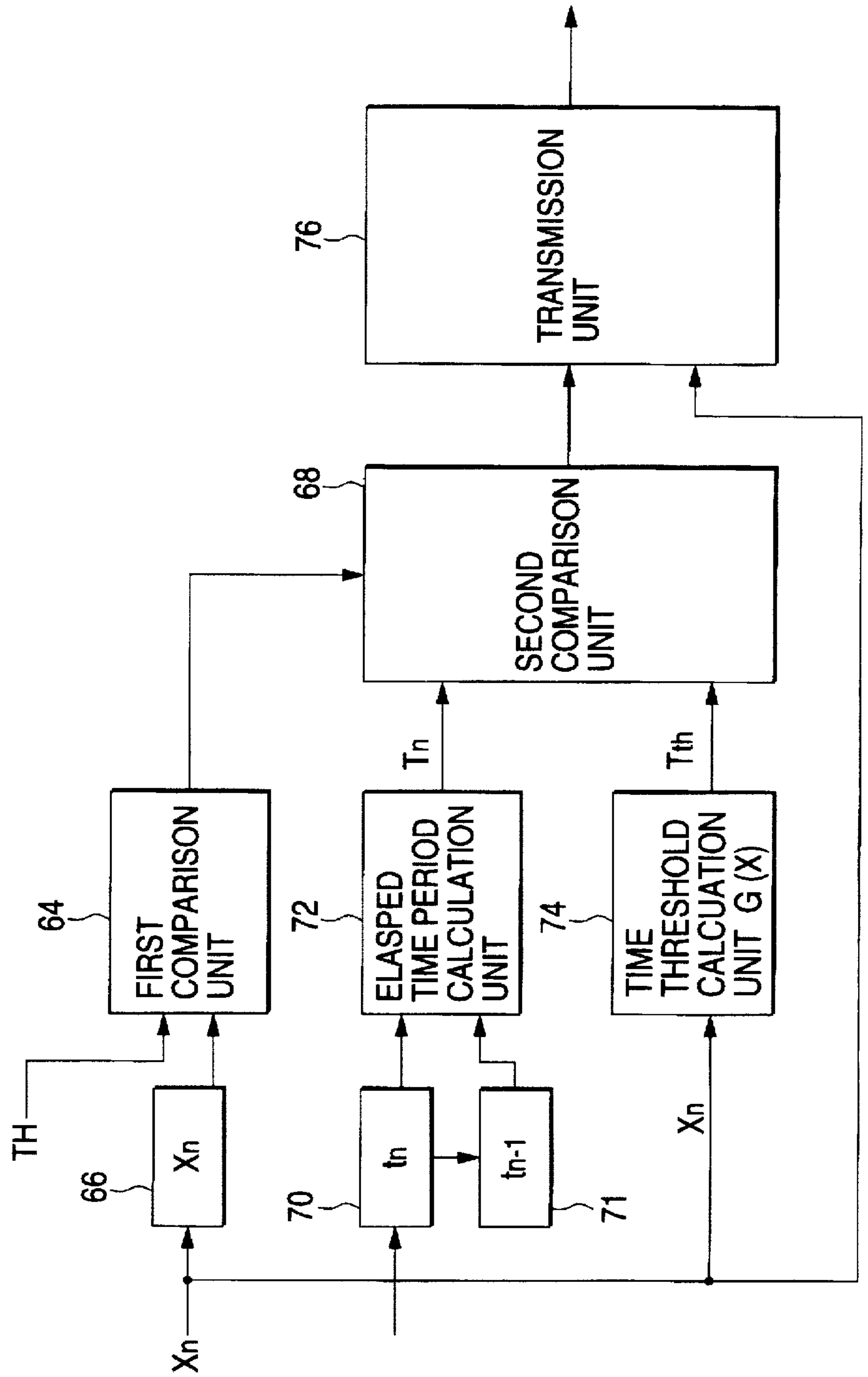
FIG. 10 is a functional block diagram of the second embodiment.

FIG. 10 is a functional block diagram of the terminal sensing device of the second embodiment of the present invention which conducts transmission processing according to the transmission conditions of FIG. 9. In the same manner as the embodiment of the present invention, this function is realized by the program control of the CPU 32 disposed in the terminal sensing device 14 of FIG. 1.

Referring to FIG. 10, when the process reaches the transmission timing for the polling from the receiver 10, the detection data $X_n$ currently held by the memory is held by a latch 66. A first comparison unit 64 compares the detection data $X_n$ latched by the latch 66 with the predetermined level threshold TH. When the detection data $X_n$ is equal to or higher than the level threshold TH, the first comparison unit 64 sends a comparison output of 1 to a second comparison unit 68. Upon reception of the comparison output of 1 from the first comparison unit 64, the second comparison unit 68 conducts the comparison operation.

The elapsed time period T is supplied from an elapsed time period calculation unit 72 to one input of the second comparison unit 68. The time period threshold $T_{th}$ is supplied from a time period threshold calculation unit 74 to the other input. The elapsed time period calculation unit 72 obtains the elapsed time period T which is the difference between the preceding detection data transmission time $t_{n-1}$ which is held by a latch 71 and the current time $t_n$ which is held by a latch 70.

Specifically, the count values of a timer counter are used as the times $t_{n-1}$ and $t_n$. The time period threshold calculation unit 74 receives the detection data $X_n$ to be transmitted and calculates the time period threshold $T_{th}$ on the basis of the detection data in accordance with the function G(X) giving the characteristic curve 60 of FIG. 9. The second comparison unit 68 compares the calculated time period threshold $T_{th}$ with the time period T which has elapsed after the time of the preceding detection data transmission. When the time period T is equal to or longer than the time period threshold $T_{th}$, the second comparison unit 68 sends a comparison output of 1 to a transmission unit 76 so that the operation of transmitting the detection data $X_n$ is conducted.

Figure 11A:
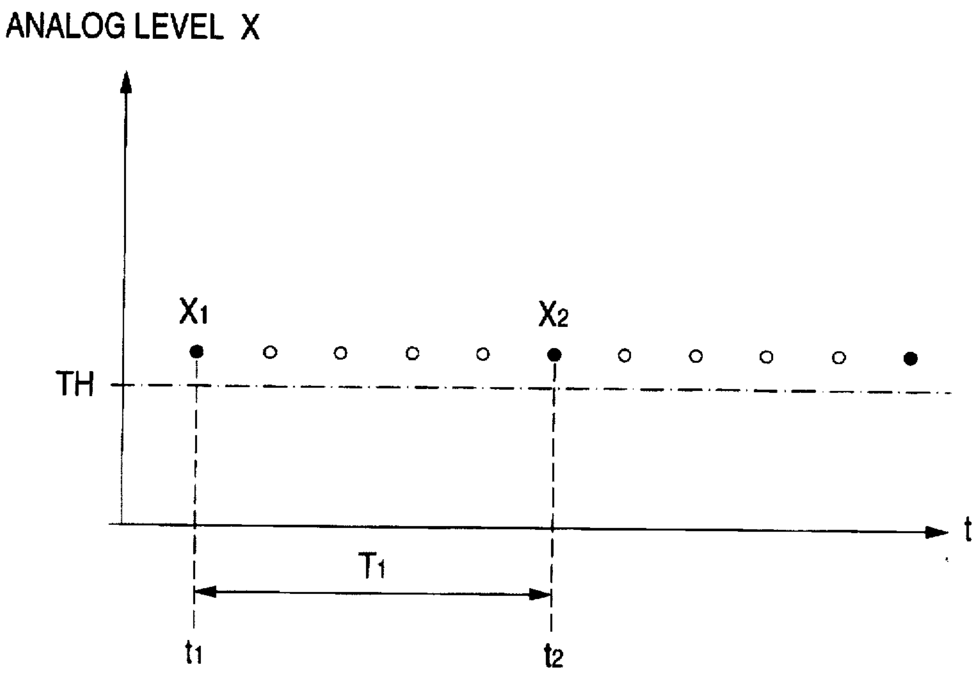
FIG. 11A and 11B are timing charts of the transmission operation which is conducted in the second embodiment in the case where an analog level is constant.
Figure 11B:
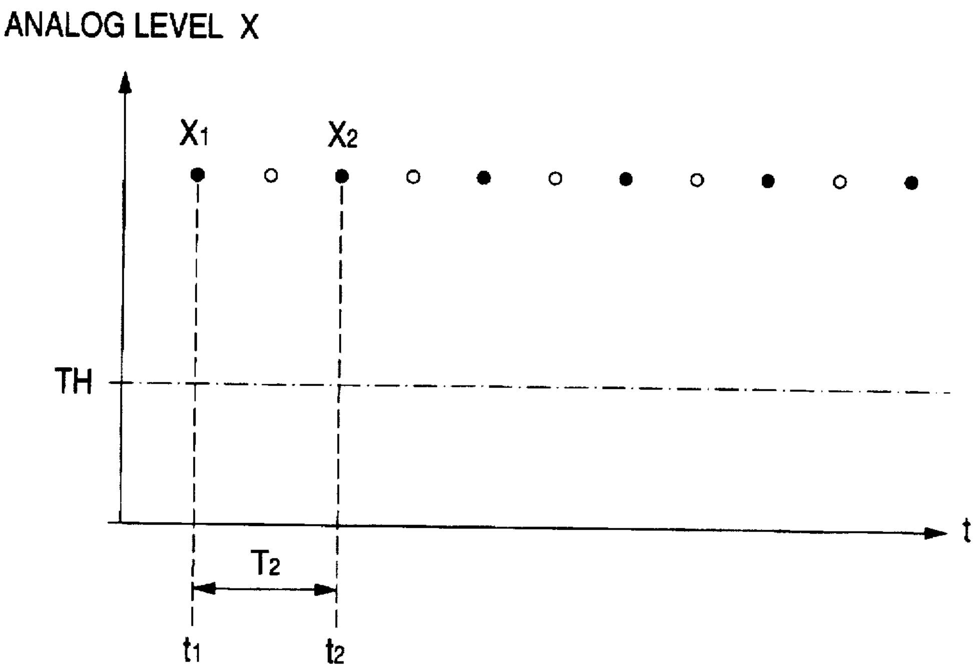

FIGS. 11A and 11B shows time charts of the transmission operation which is conducted in the second embodiment of FIG. 10 in the case where a detection data has a constant level.

FIG. 11A shows a time chart in the case where a detection data is slightly higher than the level threshold TH, and FIG. 11B shows a time chart in the case where a detection data is sufficiently higher than the level threshold TH. In the case of FIG. 11A where the level is low, a detection data is transmitted at each elapse of, for example, a time period T1 corresponding to five periods of the detection timing, so that four detection data transmissions are decimated. By contrast, in the case of FIG. 11B where the level is high, the detection data transmission indicated by a solid circle is conducted at each elapse of a time period T2 corresponding to two periods of the detection timing, so that one detection data transmission is decimated. It will be seen that, as the level becomes higher, the transmission time intervals becomes shorter, with the result that the amount of detection data to be transmitted to the receiver 10 is increased.

Figure 12:
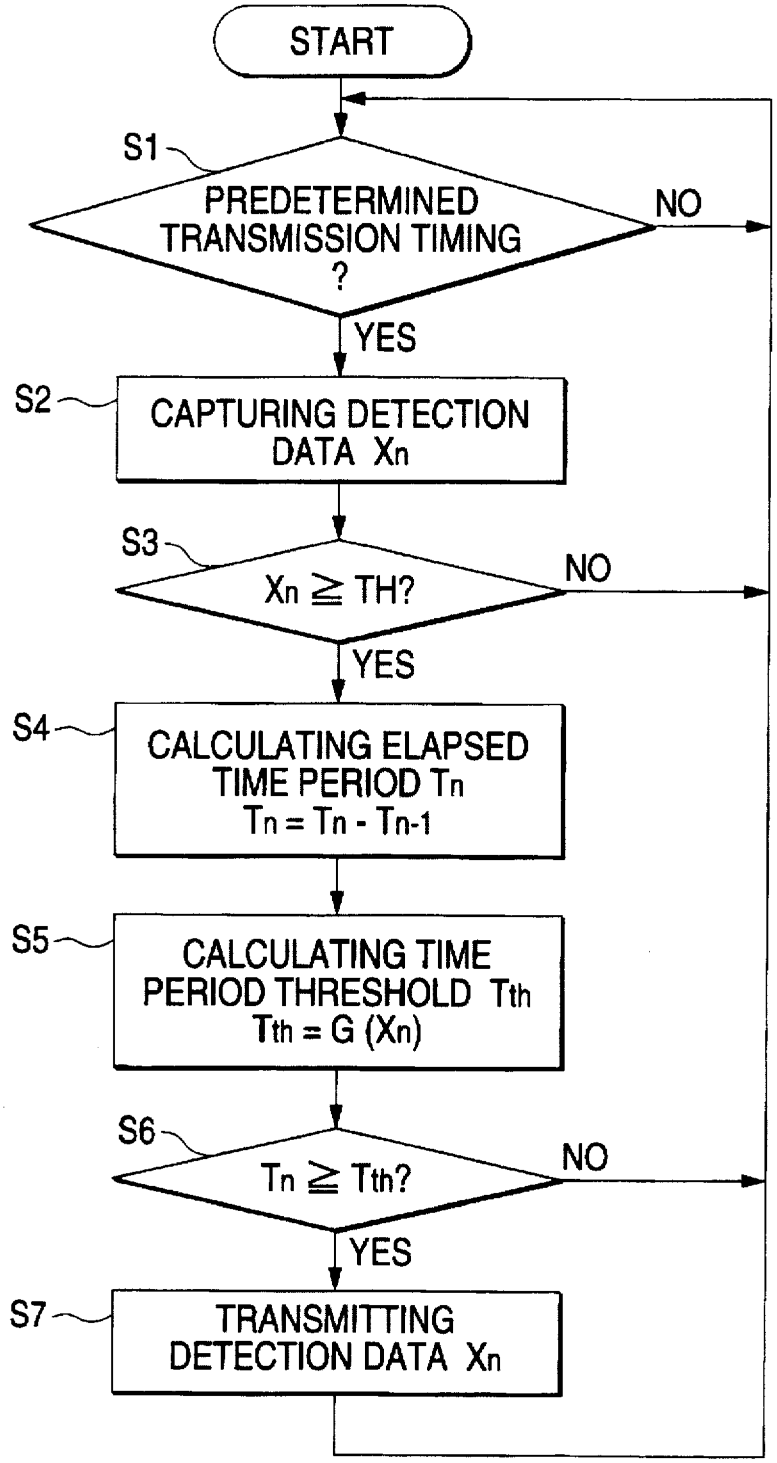
FIG. 12 is a flowchart of the transmission in the second embodiment.
Figure 13:
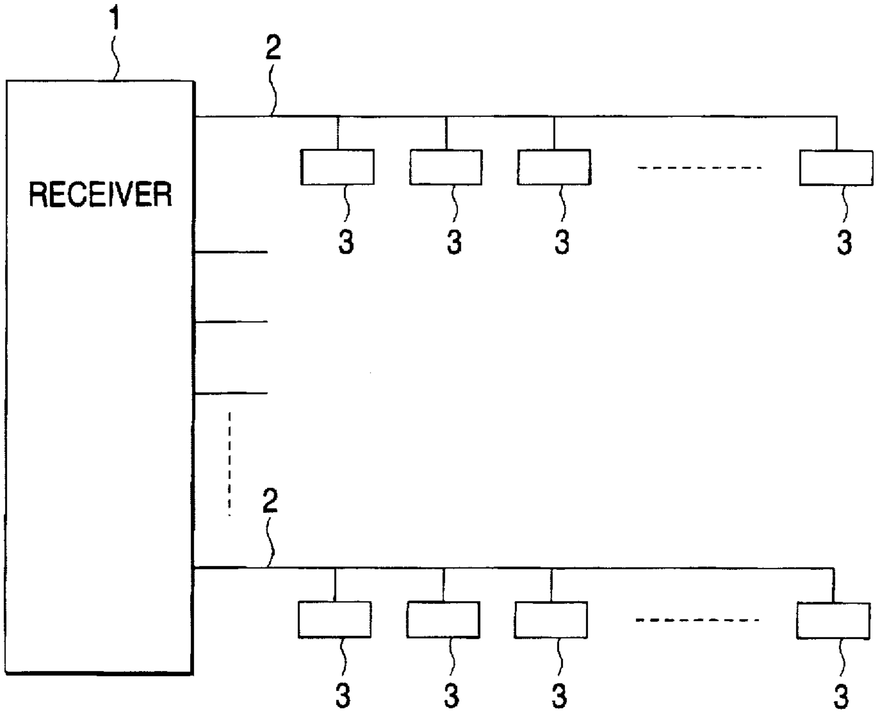
FIG. 13 is a diagram of the configuration of a conventional system.
Figure 14:
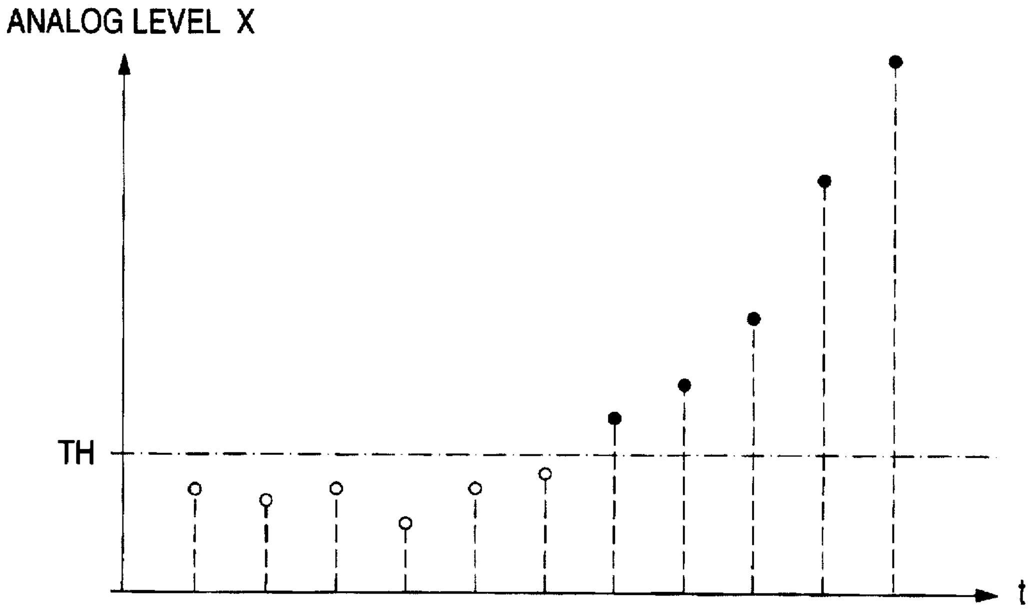
FIG. 14 is a time chart of the transmission operation of a terminal sensing device of the conventional system.

FIG. 12 is a flowchart of the transmission operation in the second embodiment shown in the functional block diagram of FIG. 10. At step S1, it is checked whether the process reaches the transmission timing or not. If the process reaches the transmission timing, the detection data $X_n$ currently held by the memory is captured and then checked at step S3 to see whether it is equal to or higher than the level threshold TH or not.

If the detection data is equal to or higher than the level threshold TH, the process proceeds to step S4 wherein the elapsed time period $T_n$ from the preceding detection data transmission time $t_{n-1}$ to the current time $t_n$ is calculated. Then the time period threshold $T_{th}$ corresponding to the current detection data is calculated at step S5 in accordance with, for example, the function G(X) of FIG. 9. At step S6, the elapsed time period $T_n$ is checked to see whether it is equal to or longer than the time period threshold $T_{th}$ or not. If the elapsed time period is equal to or longer than the time period threshold $T_{th}$, the detected detection data $X_n$ is transmitted at step S7 to the receiver 10.

The characteristics for giving the transmission conditions of the second embodiment of the present invention are not restricted to those of FIG. 9. Appropriate characteristics which are similar to those of the first invention shown in FIGS. 7 and 8 may be set for a region where the level is higher than the level threshold TH.

In the embodiments described above, the transmission conditions are judged at the transmission timing based on the polling command from the receiver 10 and a detection data is then transmitted. Alternatively, independent of a command from the receiver 10, fixed transmission intervals may be set in the terminal sensing device 14 and the operations may be then conducted in the same way as described above.

A detection data to be transmitted from the terminal sensing device 14 is not restricted to a data obtained in one detection operation of the analog sensor 40. It is a matter of course that a detection data which has undergone an averaging process, such as the moving average or simple average of analog data obtained in several detection operations may be transmitted.

As described above, according to the invention, a detection data is transmitted only when the level of the detection data is equal to or higher than a predetermined level threshold and the level difference between the detection data and a detection data of a preceding transmission is equal to or higher than a predetermined level difference threshold or a time period which has elapsed after a preceding transmission of a detection data is equal to or longer than a predetermined time period threshold. Therefore, even when the level of a detection data is raised by the occurrence of a fire, the amount of information to be transmitted is prevented from being abruptly increased, a transmission failure due to an increased transmission load and delay of the reception process due to an increased amount of information can be prevented from occurring, and a detection data transmission state suitable for the capabilities of the transmission system and the central processing unit can be attained. As a result, the reliability of the system is enhanced and judgment on an abnormal status such as a fire can be rapidly performed.

What is claimed is:

1. A terminal sensing device for a disaster prevention monitoring system, which is connected to a transmission path elongating from a central monitoring device, said terminal sensing device comprising:

detecting means for detecting an analog detection signal; and transmission processing means for judging at a predetermined period as to whether or not detection data obtained from said analog detection signal is equal to or higher than a predetermined level threshold and a difference between said detection data and a detection data of a preceding transmission is equal to or larger than a predetermined level difference threshold, and for transmitting the detection data to said central monitoring device, when the detection data is equal to or higher than the predetermined level threshold and said difference between the detection data and the detection data of the preceding transmission is equal to or larger than a predetermined level difference threshold.

2. A terminal sensing device for a disaster prevention monitoring system according to claim 1, wherein said transmission processing means comprises:

first comparison means for comparing the detection data to be transmitted with the level threshold at the predetermined period, and for outputting a first comparison output, when the detection data is equal to or higher than the level threshold;

second comparison means for comparing the difference between the detection data and the detection data of the preceding transmission with the detection data, when the first comparison output is outputted, and for outputting a second output, when the difference between the detection data and the detection data of the preceding transmission is equal to or higher than the level difference threshold; and transmission means for, when the second comparison output is outputted, transmitting the detection data to said central monitoring device.

3. A terminal sensing device for a disaster prevention monitoring system according to claim 2, wherein said second comparison means calculates the level difference threshold in accordance with a predetermined function on the basis of the detection data, and compares the calculated level difference threshold with the detection data difference.

4. A terminal sensing device for a disaster prevention monitoring system, which is connected to a transmission path elongating from a central monitoring device, said terminal sensing device comprising:

detecting means for detecting an analog detection signal; and transmission processing means for judging at a predetermined period as to whether or not detection data obtained from said analog detection signal is equal to or higher than a predetermined level threshold and a time period which elapses after a preceding detection data transmission is equal to or longer than a predetermined time period threshold, and for transmitting the detection data to said central monitoring device, when the detection data is equal to or higher than the predetermined level threshold and said elapsed time period is equal to or longer than the predetermined time period threshold.

5. A terminal sensing device for a disaster prevention monitoring system according to claim 4, wherein said transmission processing unit comprises:

first comparison means for comparing the detection data to be transmitted with the level threshold, and for outputting a first comparison output, when the detection data is equal to or higher than the level threshold;

second comparison means for, when the first comparison output is outputted, comparing the time period which elapses after a time of a preceding detection data transmission with a predetermined time period threshold, and for outputting a second comparison threshold, when the elapsed time period is equal to or longer than the time period threshold; and transmission means for, when the second comparison output is outputted, transmitting the detection data to said central monitoring device.

6. A terminal sensing device for a disaster prevention monitoring system according to claim 5, wherein said second comparison means calculates the time period threshold in accordance with a predetermined function on the basis of the detection data, and compares the calculated time period threshold with the elapsed time period.

* * * * *